(12) United States Patent
Han (10) Patent No.: US 12,208,963 B2
(45) Date of Patent: Jan. 28, 2025

(54) GOODS PICKING AND CONVEYING DEVICE, GOODS PICKING SYSTEM AND METHOD

(71) Applicant: BEIJING JINGDONG ZHENSHI INFORMATION TECHNOLOGY CO., LTD., Beijing (CN)

(72) Inventor: Song Han, Beijing (CN)

(73) Assignee: BEIJING JINGDONG ZHENSHI INFORMATION TECHNOLOGY CO., LTD., Beijing (CN)

( * ) Notice: Subject to any disclaimer, the term of this patent is extended or adjusted under 35 U.S.C. 154(b) by 1060 days.

(21) Appl. No.: 17/258,388

(22) PCT Filed: Jul. 26, 2019

(86) PCT No.: PCT/CN2019/097945
§ 371 (c)(1),
(2) Date: Jan. 6, 2021

(87) PCT Pub. No.: WO2020/020357
PCT Pub. Date: Jan. 31, 2020

(65) Prior Publication Data
US 2021/0292089 A1    Sep. 23, 2021

(30) Foreign Application Priority Data

Jul. 26, 2018    (CN) .......................... 201810835874.7

(51) Int. Cl.
*B65G 1/137*    (2006.01)
*B61B 3/00*    (2006.01)
(Continued)

(52) U.S. Cl.
CPC .............. *B65G 1/1373* (2013.01); *B61B 3/00* (2013.01); *B65G 1/0457* (2013.01);
(Continued)

(58) Field of Classification Search
CPC .. B65G 1/1373; B65G 1/0457; B65G 1/0485; B65G 1/1371; B65G 47/64;
(Continued)

(56) References Cited

U.S. PATENT DOCUMENTS 7,138,596 B2 *  11/2006  Pippin .................... B65H 29/14
                                                    700/223
7,591,630 B2    9/2009   Lert, Jr.
(Continued)

FOREIGN PATENT DOCUMENTS

CN    201451527 U    5/2010
CN    102774641 A    11/2012
(Continued)

OTHER PUBLICATIONS

International Search Report issued on Sep. 30, 2019 in PCT/CN2019/097945 filed on Jul. 26, 2019, 2 pages.
(Continued)

*Primary Examiner* — Michael Collins
(74) *Attorney, Agent, or Firm* — Oblon, McClelland, Maier & Neustadt, L.L.P.

(57) ABSTRACT

The present disclosure relates to a goods picking and conveying device, a goods picking system and a goods picking method. The conveying device includes a container configured to accommodate goods; a track arranged on a suspended ceiling of a warehouse to guide the container to move; and a container scanning controller configured to identify the container running on the track, and obtain conveying information of the container according to an identification result, and cause the container to move to a corresponding check station according to the conveying information of the container.

20 Claims, 3 Drawing Sheets

(51) Int. Cl.
*B65G 1/04* (2006.01)
*B65G 47/64* (2006.01)
*E01B 25/26* (2006.01)

(52) U.S. Cl.
CPC ......... *B65G 1/0485* (2013.01); *B65G 1/1371* (2013.01); *B65G 47/64* (2013.01); *E01B 25/26* (2013.01); *B65G 2203/0216* (2013.01); *B65G 2203/0283* (2013.01)

(58) Field of Classification Search
CPC .... B65G 2203/0216; B65G 2203/0283; B61B 3/00; E01B 25/26
See application file for complete search history.

(56) References Cited

U.S. PATENT DOCUMENTS

| | | | |
|---|---|---|---|
| 8,784,034 | B2 | 7/2014 | Lert, Jr. |
| 9,802,759 | B2 | 10/2017 | Lert, Jr. |
| 10,083,847 | B2* | 9/2018 | Tomida ............. H01L 21/67259 |
| 10,239,704 | B2* | 3/2019 | Messner ............... B65G 1/0492 |
| 11,619,930 | B2* | 4/2023 | Voelker ................ B65G 1/1378 700/223 |
| 2005/0047895 | A1 | 3/2005 | Lert, Jr. |
| 2007/0209976 | A1* | 9/2007 | Worth ....................... B07C 3/08 209/584 |
| 2008/0086231 | A1* | 4/2008 | Kim ..................... B25J 15/0491 700/215 |
| 2008/0219825 | A1* | 9/2008 | Yoshida ................. B65G 47/61 414/749.6 |
| 2013/0213755 | A1* | 8/2013 | Shibata ..................... B61J 1/06 191/22 R |
| 2015/0071743 | A1 | 3/2015 | Lert, Jr. |
| 2017/0137240 | A1* | 5/2017 | Tsuji ................. H01L 21/68707 |
| 2017/0247190 | A1* | 8/2017 | Horii .................... B65G 19/025 |
| 2018/0065807 | A1 | 3/2018 | Lert, Jr. |
| 2018/0327009 | A1* | 11/2018 | Takagawa ............... B61L 27/04 |
| 2019/0033835 | A1* | 1/2019 | Ahammer ........ G05B 19/41865 |
| 2019/0377335 | A1* | 12/2019 | Voelker ............. G06Q 10/0832 |

FOREIGN PATENT DOCUMENTS

| | | |
|---|---|---|
| CN | 102785882 A | 11/2012 |
| CN | 202953467 U | 5/2013 |
| CN | 203048067 U | 7/2013 |
| CN | 104229408 A | 12/2014 |
| CN | 105600294 A | 5/2016 |
| CN | 205204236 U | 5/2016 |
| CN | 106429161 A | 2/2017 |
| CN | 106672571 A | 5/2017 |
| CN | 107428469 A | 12/2017 |
| CN | 107738777 A | 2/2018 |
| JP | 57-67413 A | 4/1982 |
| JP | 06-179506 A | 6/1994 |
| JP | 2001 - 84038 A | 3/2001 |
| JP | 2001-253515 A | 9/2001 |
| JP | 2006-36507 A | 2/2006 |
| JP | 2010-102590 A | 5/2010 |
| KR | 10-0660208 81 | 12/2006 |

OTHER PUBLICATIONS

Combined Chinese Office Action and Search Report issued May 7, 2021 In Chinese Patent Application No. 201810835874.7, citing documents AO through AS therein. 13 pages.
Combined Chinese Office Action and Search Report issued Jan. 18, 2022 in Chinese Patent Application No. 201810835874.7 (with English translation of Category of Cited Documents), 17 pages.
Postal Automation Excerpt, Youzheng Zidonghua, Jan. 31, 2000, pp. 82-84 (with bibliographic data, total 17 pages).
Planning and Design of Distribution Center, Peisongzhongxin Guihusyusheji, China Fortune Press, Oct. 31, 2014, p. 187 (with bibliographic data, total 13 pages).
Japanese Office Action issued on Mar. 6, 2023 in Japanese Patent Application No. 2021-500380, 13 pages.

* cited by examiner

GOODS PICKING AND CONVEYING DEVICE, GOODS PICKING SYSTEM AND METHOD

CROSS-REFERENCE TO RELATED APPLICATIONS

This disclosure is a U.S. National Stage Application under 35 U.S.C. § 371 of International Patent Application No. PCT/CN2019/097945, filed on Jul. 26, 2019, which is based upon and claims priority to Chinese Patent Application No. 201810835874.7, filed on Jul. 26, 2018, the entire content of which is incorporated herein by reference.

TECHNICAL FIELD

The present disclosure relates to the technical field of logistics storage, and in particular to a goods picking and conveying device, a goods picking system and a goods picking method.

BACKGROUND

With the development of online shopping, shopping websites generate millions or tens of millions of orders every day, and warehouse pickers in warehousing logistics companies pick ordered products in a warehouse. Time spent by the pickers in warehouse during sorting has a direct impact on timeliness of products to reach customers. Therefore, many warehouse logistics companies attach great importance to the picking efficiency of the pickers.

Particularly, a new retailing concept is proposed so that the storage of goods is not limited in specialized large warehouses through the combination of online and offline stores. Warehouses are arranged in city suburbs due to the large construction area, and the goods can be also stored in stores or large supermarkets in city. In particular, storing the goods in the large city supermarkets not only meets the on-site shopping needs of the customers, but also supports the production and distribution of online orders, therefore production timeliness of orders and user experience are improved. This model is also a main investment direction for major e-commerce platforms.

In the existing large warehouses, after the goods are picked up by the pickers, goods containers are usually conveyed to checking and packing stations by using two manners; the first manner is that the goods is pushed to the checking and packing stations by a goods picking truck, the pickers need to walk a long distance to convey the goods in the truck to the checking and packing stations. Therefore, the manner makes the pickers exhaust great physical strength. The second manner is to use a conveyor belt, that is, the pickers place the picked goods containers into the conveyor belt to be automatically conveyed to the checking and packing stations; the manner makes the pickers not required to repeatedly walk through the warehouses so as to save physical strength. But, the second manner needs large warehouse area for setting up conveyor belt equipment, and there is a large demand for area of the warehouse, therefore the equipment used in this manner is generally installed in the large warehouse in the city suburb. However, it is difficult to realize offline production of online orders and conveying by conveyor belt in large city supermarkets.

SUMMARY

According to some embodiments of the present disclosure, a goods picking and conveying device, a goods picking system and a goods picking method are provided, which save the occupied space of the goods conveying device so as to increase the universality of the conveying device.

According to a first aspect, an embodiment of the present disclosure provides a goods picking and conveying device; and the device includes: a container configured to accommodate goods; a track arranged on a suspended ceiling of a warehouse to guide the container to move; and a container scanning controller, configured to identify the container running on the track, obtain conveying information of the container according to an identification result, and cause the container to move to corresponding a checking station according to the conveying information of the container.

In some embodiments, the conveying information includes a path moving along the track and a serial number of the checking station.

In some embodiments, the checking station includes a single-container checking station and a container converging checking station, and the track includes: a main track; and a plurality of branch tracks including a first branch track configured to guide the container to move from the main track to the container converging checking station, and a second branch track configured to guide the container to move from the main track to the single-container checking station.

In some embodiments, further including a track switching mechanism, which is arranged at a junction between the main track and each of the branch tracks, and configured to switch to a connection state of the main track and a branch track to be entered by the container after receiving a control signal of the container scanning controller.

In some embodiments, the first branch track is positioned on an extension line of the main track, and the second branch track is disposed angularly to the main track; wherein the track switching mechanism includes: a turning slideway with a first end connected to the second branch track; and a moving slideway configured to switch between a first position and a second position after receiving the control signal of the container scanning controller, wherein the first position is located between the main track and the first branch track, and the second position directly faces a second end of the turning slideway.

In some embodiments, further including disengagement triggers, which are arranged on track corresponding to respective checking stations, and configured to be triggered after receiving release instruction of the container scanning controller, so as to cause the container to disengage from the track and enter the corresponding checking station.

In some embodiments, further including a container slideway, which is arranged between the track and the checking station to guide the container disengaged from the track to the checking station.

In some embodiments, further including a suspending component configured to suspend the container, wherein the track includes a fixed track arranged on the suspended ceiling and a sliding track slidably arranged with respect to the fixed track, and the suspending component is arranged on the sliding track and is movable along with the sliding track.

In some embodiments, the main track and each of the first branch track and the second branch track form a closed conveying path.

In some embodiments, the main track is provided with a mounting region for the container to be mounted on the main track.

In some embodiments, further including an interval retaining component, which is arranged on the main track downstream of the mounting region to determine time difference of adjacent containers passing through the interval retaining component, so that a predetermined distance interval is kept between the adjacent containers.

In some embodiments, the goods accommodated in the container are articles for a plurality of orders, or part or all of articles for one order.

According to a second aspect, an embodiment of the present disclosure provides a goods picking system; and the system includes: the aforementioned goods picking and conveying device; and a checking station configured to check and pack the goods in the container.

In some embodiments, the checking station includes: a single-container checking station configured to check and pack the goods in a single container; and a container converging checking station configured to check and pack the goods in a plurality of container together.

In some embodiments, further including a background service system configured to receive corresponding information between ordered goods provided from outside and the container, and determine the conveying information of the container according to an order, wherein the container scanning controller is configured to obtain the conveying information of current container from the background service system according to the identification result of the container.

In some embodiments, further including the background service system configured to receive corresponding information between ordered goods provided from outside and the container, wherein the checking station is in communication connection with the background service system to provide information for checking whether the ordered goods are correct, a packing type of the ordered goods, and/or whether the current container is required to be separated/merged after identifying the container.

According to a third aspect, an embodiment of the present disclosure provides a conveying method based on the goods picking and conveying device; and the method includes: causing the container to move along the track; and identifying the container by the container scanning controller, obtaining conveying information of the container according to an identification result by the container scanning controller, and causing the container to move to a corresponding checking station according to the conveying information of the container by the container scanning controller.

In some embodiments, obtaining conveying information of the container by the container scanning controller according to the identification result so as to cause the container to move to the corresponding checking station includes: obtaining a branch track to be entered by the container and a serial number of the checking station to be entered by the container by the container scanning controller; and causing the container to move from a main track to a corresponding container converging checking station via a first branch track by the container scanning controller, or move from the main track to a corresponding single-container checking station via a second branch track by the container scanning controller.

In some embodiments, further including the following steps after obtaining the conveying information of the container: sending a state control signal to a track switching mechanism by the container scanning controller; and causing the track switching mechanism to receive the state control signal and switch into a connection state of the main track and a branch track to be entered by the container.

In some embodiments, in a process of causing the current container to move from the track to the checking station, further including: determining whether the container has arrived at a predetermined checking station by the container scanning controller; if so, sending a release instruction to a disengagement trigger; if not, keeping the container moving; and triggering the disengagement trigger after receiving the release instruction to cause the container to disengage from the track and enter the corresponding checking station.

In some embodiments, determining whether the container has arrived at the predetermined checking station by the container scanning controller includes: determining whether the container has arrived at the predetermined checking station according to a required time for the container to depart from the container scanning controller to arrive at the predetermined checking station by the container scanning controller.

In some embodiments, determining whether the container has arrived at the predetermined checking station by the container scanning controller includes: identifying the container and sending an identification result to the container scanning controller by the scanning component arranged on the disengagement trigger; and determining whether the container where the disengagement trigger is located has arrived at the predetermined checking station by the container scanning controller; if so, sending a release instruction to current disengagement trigger; if not, keeping the container moving.

In some embodiments, in a case that the container checking station is faulty or check capacity does not meet conveying volume of the container, further including: causing at least part of the container to move from a branch track to the main track so as to keep the container moving around a closed conveying path.

In some embodiments, containers in the same order move to the same container converging checking station when the container moves towards the container converging checking station.

In the goods picking and conveying device according to embodiments of the present disclosure, a track is arranged on a suspended ceiling of a warehouse, so that the floor space occupied in warehouse is reduced during automatic production, and the storage rate of goods in the floor space of the warehouse is increased, therefore improving the types and amounts of the goods stored in the warehouse. Thus, the conveying device is suit for large warehouses, city internal stores or large supermarkets, with the increased universality. Moreover, the container scanning controller can identify the container to obtain the conveying information thereof, so that the container moves to corresponding checking station, thereby increasing the automation level of goods conveyance.

BRIEF DESCRIPTION OF THE DRAWINGS

The drawings described herein are used to further understand the present disclosure and constitute a part of this application; and the schematic embodiments of the present disclosure and the descriptions thereof are used to explain the present disclosure and do not constitute improper limitations to the present disclosure. In the accompanying drawings.

DETAILED DESCRIPTION

The following describes the present disclosure in detail. The following paragraphs define different aspects of the embodiments in more detail. Unless clearly stated, such defined aspects may be in combination with any or more of other aspects. In particular, any feature considered to be preferred or advantageous may be in combination with one or more of other features considered to be preferred or advantageous.

Terminologies "first" and "second" of the present disclosure are only for the convenience of description so as to distinguish different components with the same name, instead of expressing precedence or priority relation.

In the descriptions of the present disclosure, the orientation or position relationship indicated by words such as "upper", "lower", "top", "bottom", "front", "back", "inner" and "outer" is based on the orientation or position relationship as shown in the drawings, only used to facilitate the descriptions of the present disclosure. These words do not indicate or imply that referred devices must have a specific orientation or be constructed and operated in a specific orientation, and thus they cannot be understood as a limitation to the protection scope of the present disclosure.

As shown in FIG. 1 to FIG. 6, a goods picking system is provided. In some embodiments, the goods picking system includes a goods picking and conveying device, a container 1 and a checking station, wherein containers 1 are configured to accommodate goods. A plurality of containers can be provided. The pickers pick the goods according to orders, take down the ordered goods from corresponding shelves 11 and place them in the container 1. The goods accommodated in each container 1 may be products corresponding to a plurality of orders, or some or all of products corresponding one order. In a picking process, goods information is scanned by the pickers via a mobile terminal, and uploaded to a background service system 13.

The container 1 are moved to checking station through the goods picking and conveying device; and then the checking station separates the goods in the container 1 based on the orders to check whether each orderitem is correct, and packs corresponding goods for each order. The picking station uses Rebin picking station similar to nine-square grids, which can bind nine orders at the same time, and distribute the orderitem to different grids.

In the present disclosure, the goods picking and conveying device is improved. In some embodiments, the goods picking and conveying device includes a track 30 and a container scanning controller 5. The track 30 is arranged on a suspended ceiling 12 of a warehouse, and the container 1 can move along the track 30. Specifically, the container 1 is driven to move along with the movement of the track 30; or the container 1 are directly driven to move by a driving component when the track 30 is stationary. The container scanning controller 5 is used for identifying the container 1. For example, the container 1 is provided with an identification, such as a barcode or a QR code, so that the serial number of the container 1 is identified by scanning, and the conveying information of the container 1 is obtained according to an identification result, and the respective container 1 are moved to corresponding checking stations according to the conveying information thereof.

The conveying information includes a path moving along the track 30 and a serial number of the checking station. Such information is stored into the background service system 13. After identifying the serial numbers of the container 1, the container scanning controller 5 sends the identification results to the background service system 13; the background service system 13 sends the conveying information matching with the current container 1 to the container scanning controller 5; and the container scanning controller 5 causes the current container 1 to move to the corresponding checking station. Alternatively, the container scanning controller 5 may also obtain the conveying information of all the containers 1 from the background service system 13 in advance.

In the goods picking and conveying device according to embodiments of the present disclosure, a track is arranged on a suspended ceiling of a warehouse, so that it is possible that the floor space occupation in the warehouse is reduced during automated production, and the storage rate of goods of the floor space in the warehouse is increased, thus the types and amounts of the goods stored in the warehouse are increased. Therefore, the conveying device is suit for large warehouses, warehouses of city internal stores or large supermarkets, with the increased universality. Such goods picking and conveying device can effectively solve the converging of online and offline stores, so that goods can be stored not only in large suburban warehouses, but also in city internal stores or large supermarkets, therefore more quickly meeting the shopping needs of corresponding customers and improving timeliness of orders and user experience.

Furthermore, the container scanning controller 5 can identify the container 1 to obtain the conveying information thereof, so that the container are automatically and accurately moved to the corresponding checking station, the automation level during the goods conveyance is improved, the physical consumption of pickers is reduced, and the efficiency and accuracy of the entire picking process is improved.

Figure 1:
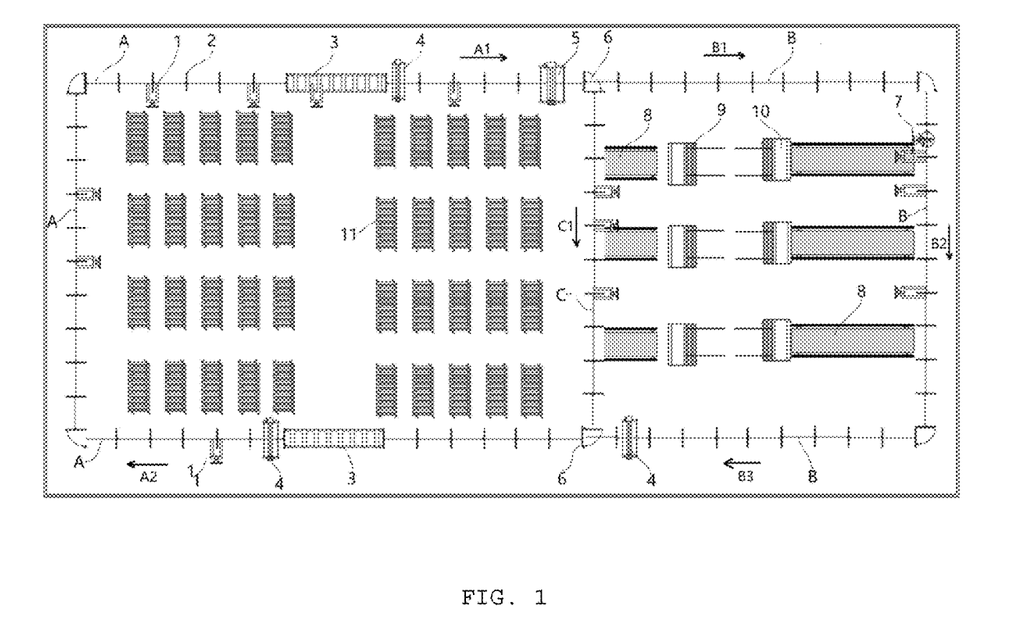
FIG. 1 is a schematic structural diagram of a goods picking system arranged in a warehouse according to an embodiment of the present disclosure.

In some embodiments, as shown in FIG. 1, the checking station include a single-container checking station 9 and a container converging checking station 10. The single-container checking station 9 is used for checking and packing the goods in single container 1; and the container converging checking station 10 is used for checking and packing the goods in the plurality of containers 1. Optionally, when the container 1 moves towards the container converging checking station 10, the containers 1 belonging to the same order are moved to the same container converging checking station 10.

Accordingly, still referring to FIG. 1, the track 30 includes a main track A and a plurality of branch tracks including first branch track B and second branch track C. The main track A is a common moving path of the respective container 1; the first branch track B is used for guiding the container 1 to move from the main track A towards the container converging checking station 10; and the second branch track C are used for guiding the container 1 to move from the main track A towards the single-container checking station 9. According to the demand of the picking task quantity, one track section or a plurality of track sections may be arranged.

The container 1 required to enter different types of checking station can be classified and conveyed by arranging the branch tracks, so that the container 1 is accurately and reliably conveyed to the corresponding checking station. The congestion of the containers 1 on the track can be reduced by diversion, more containers 1 can be conveyed simultaneously, and the conveying efficiency is improved.

After the container 1 is scanned by the checking station, a checking system prompts an operator the packing type of the container or whether the container is merged according to scanning results.

FIG. 1 illuminates a structure for arranging the goods picking and conveying device of the present disclosure in a warehouse. The shelves 11 are placed on the left zone of the warehouse, and checking stations are placed on the right zone of the warehouse. For example, three rows and two columns of checking stations are arranged, the left column of the checking stations are the single-container checking stations 9, and the right column of the checking stations are the container converging checking stations 10. The main track A surrounding around the periphery of the shelves 11 forms a C-shaped structure with openings towards the right. The openings between two ends of the C-shaped structure are connected by second branch track C positioned between the rightmost shelves 11 and the single-container checking stations 9. The first branch track B is in a C-shaped structure with openings towards the left, and the first branch track B is arranged around the paths of the respective checking stations except the second branch track C.

In the present embodiment, the top space of the warehouse not directly opposite to the shelves and the checking station is fully utilized, which can improve safety of conveying work. Once the container drops down due to the faults, it will not bring safety impact to an operation area adjacent to the shelves and the checking station. Moreover, most of tracks are positioned in the area adjacent to the edge of the warehouse top, which is convenient for installation, and is not easy to affect a central operation area.

In some embodiments, as shown in FIG. 1, such goods picking and conveying device further includes a track switching mechanism 6, which is arranged at a junction between the main track A and two branch tracks, and used for switching to the connection state of the main track A and the branch track to be entered by the container 1 after receiving the control signal of the container scanning controller, so as to make the current container 1 enters the matched branch track to further move the predetermined checking station.

In this embodiment, the container 1 optionally enters the matched branch track by arranging the track switching mechanism 6 when the branch tracks and the main track A have different extension directions. This is equivalent to establishing a connection relationship between the main track A and different branch tracks, so that the container 1 reliably moves to the corresponding branch tracks.

Figure 4:
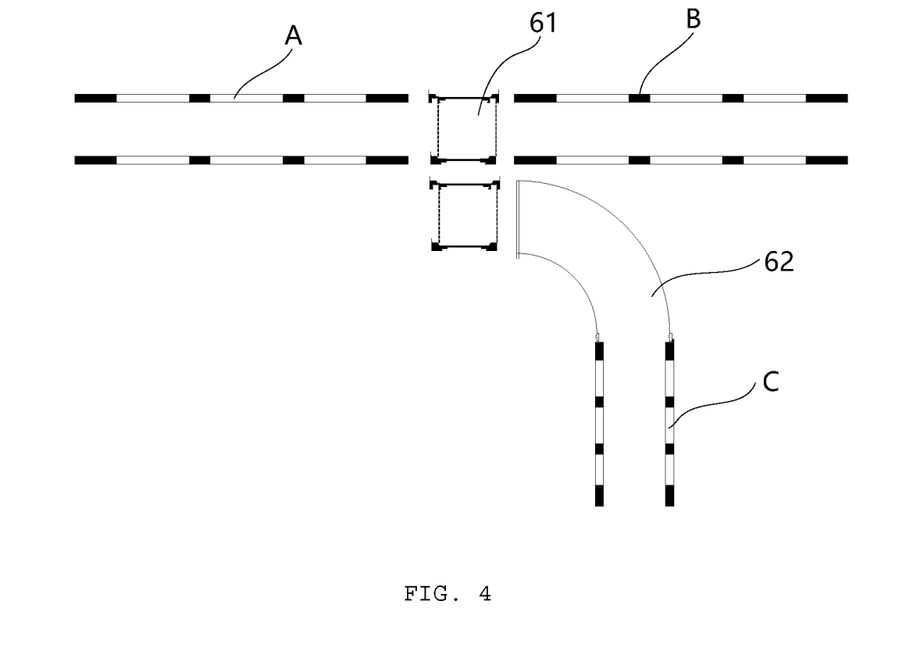
FIG. 4 is a schematic structural diagram of a track switching mechanism of a goods picking and conveying device according to an embodiment of the present disclosure.

In a specific embodiment, as shown in FIG. 4, the first branch track B is positioned on the extension line of the main track A, and the second branch track C is disposed angularly to the main track A, for example, as shown in FIG. 4, the angle may be 90°, an acute angle or an obtuse angle.

Accordingly, the track switching mechanism 6 includes a moving slideway 61 and a turning slideway 62. The first end of the turning slideway 62 is connected to the second branch track C, and the moving slideway 61 is used for switching between a first position and a second position after receiving the control signal of the container scanning controller 5. The first position is between the main track A and the first branch track B, and the second position directly faces towards the second end of the turning slideway 62. When the moving slideway 61 is switched between the first position and the second position, the moving direction of the container 1 is perpendicular to the main track A. Both the moving slideway 61 and the turning slideway 62 include the driving component, which can drive the container 1 to move independently.

Figure 5:
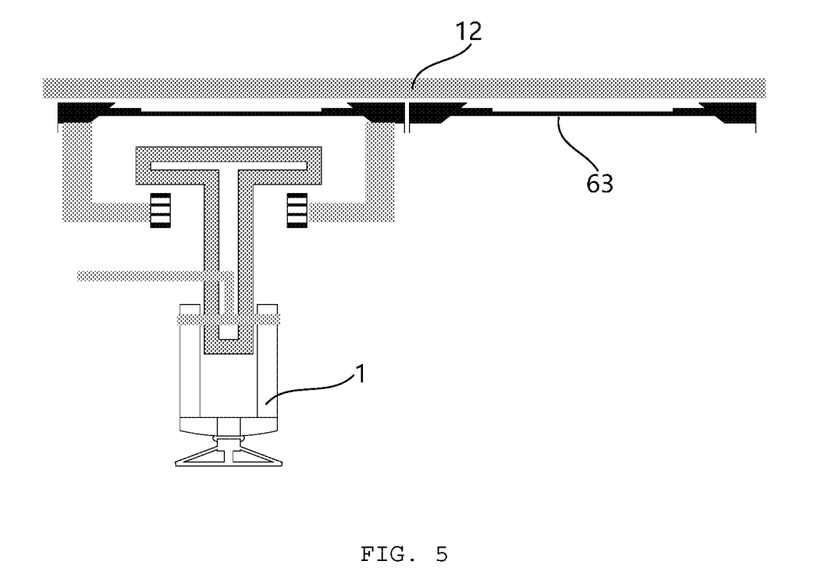
FIG. 5 is a schematic diagram of position switching of a moving slideway in a track turning structure as shown in FIG. 4.

FIG. 5 is a left view of FIG. 4, when the container 1 necessarily moves to the first branch track B, the container scanning controller 5 causes the moving slideway 61 to be in the first position and ensures that the moving slideway 61 is in operation condition, and the container 1 on the main track A moves to the first branch track B through the transition of the moving slideway 61.

When the container 1 necessarily moves to the second branch track C, the container scanning controller 5 causes the moving slideway 61 to be in the first position and ensures that the moving slideway 61 is in operation condition, the container 1 on the main track A will move to the moving slideway 61. Then operating of the moving slideway 61 is stopped, and the container scanning controller 5 causes the moving slideway 61 to switch into the second position to directly face the second end of the turning slideway 62. At this moment, the moving slideway 61 and the turning slideway are respectively in an operation condition, and the container 1 moves to the turning slideway 62 so as to further move to the second branch track C. After that, the moving slideway 61 is reset to the first position.

As shown in FIG. 4, the first branch track B is spaced from the main track A along the length direction; the second branch track C is arranged perpendicularly on one side of the first branch track B; a connecting end of the second branch track C is spaced from the first branch track B in the respective length direction, and is offset from the connecting end of the first branch track B along its width direction away from the main track A. The turning slideway 62 is a quarter of an arc slideway. For the purpose of switching the moving slideway 61 between the first position and the second position, as shown in FIG. 5, a guide track 63 is arranged on the suspended ceiling 12 so as to guide the moving slideway 61 to move.

In some embodiments, as shown in FIG. 1, the goods picking and conveying device of the present disclosure further includes disengagement triggers 7, which are arranged on the track 30 corresponding to respective checking stations, and configured to be triggered after receiving the release instruction of the container scanning controller 5, so as to cause the container 1 to disengage from the track 30 and enter the corresponding checking station.

Specifically, as shown in FIG. 1, the disengagement triggers 7 can be respectively arranged on the positions of the first branch track B corresponding to the container converging checking station 10 and the second branch track C corresponding to the single-container checking station 9.

In this embodiment, the container 1 automatically drops down when moving to the predetermined checking station, automatic circulation from the conveying device to the checking station can be realized, and the container 1 accurately enters the predetermined checking station.

Figure 3:
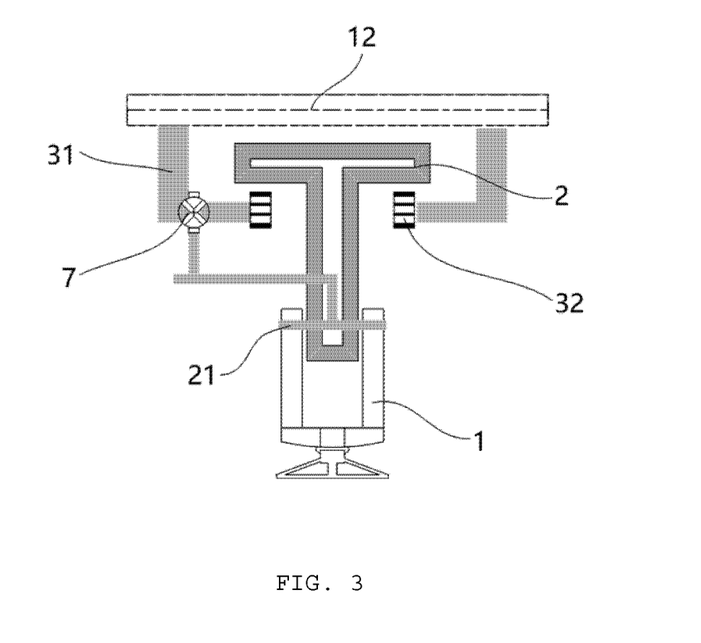
FIG. 3 is a schematic structural diagram of an end surface of a track of a goods picking and conveying device according to an embodiment of the present disclosure.

The disengagement trigger 7 can be triggered by various triggering manners. In some embodiments, the container 1 is mounted on the track 30 by electromagnetic attraction, and thus the container can be disengaged from the track 30 through electromagnetic triggering. In other embodiments, as shown in FIG. 3, the disengagement trigger 7 is arranged on the track 31, and has a contact point with a hook 21 of suspending component 2. After receiving the release instruction of the container scanning controller 5, the disengagement trigger 7 applies triggering force to the hook 21 to make the hook 21 act, so that the container 1 is disengaged from the hook 21. For example, the hook 21 is in an inverted T-shaped, and both ends of the transverse part of the inverted T-shaped structure can be retracted inward to break away from supporting the container 1. The hook 21 is reset after the container 1 drops down.

The container scanning controller 5 determines whether the container 1 reaches the predetermined checking station by using two manners. The first manner is to judge according to the time required for the container 1 to move from the position of the container scanning controller 5 to the predetermined checking station. In the second manner, a scanning component is arranged on the disengagement trigger 7, the container 1 is identified by the scanning component, and the identification result is sent to the container scanning controller 5. The container scanning controller 5 judges whether the container 1 which has arrived at the position of the current disengagement trigger 7 has arrived at the predetermined checking station according to the identification result, and if the container 1 has arrived, the container scanning controller 5 sends the release instruction to the current disengagement trigger 7; otherwise, the container 1 continues to move, and continues to judge when the container 1 moves to the next disengagement trigger 7.

As the track 30 is arranged on the suspended ceiling 12, in order to reduce impact force on the container 1 when dropping down and prevent damage of goods, as shown in FIG. 1, the goods picking and conveying device of the present disclosure also includes a container slideway 8 arranged between the track 30 and the checking station to guide the container 1 disengaged from the track 30 to the checking station. For example, the container slideway 8 may be either a slope or a spirally descending guide slideway.

Figure 2:
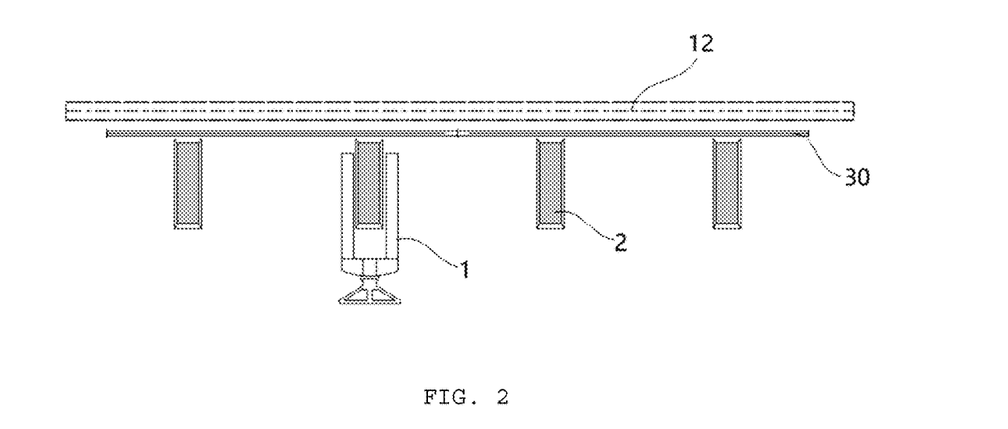
FIG. 2 is a side view of a track of a goods picking and conveying device according to an embodiment of the present disclosure.

In some embodiments, as shown in FIG. 2, the goods picking and conveying device further includes a suspending component 2 configured to suspend the container 1. The track 30 is arranged on the suspended ceiling 12, and the suspending component 2 is arranged on the track 30. As shown in FIG. 3, the track 30 includes a fixed track 31 and a sliding track 32. The fixed track 31 is arranged on the suspended ceiling 12, and the sliding track 32 is slidably arranged with respect to the fixed track 31. For example, the sliding track 32 may use a belt or a roller and has a high friction so that the suspending component 2 has certain friction force and can move along with the sliding track 32 when the suspending component 2 is mounted on the sliding track 32. The hook 21 is arranged at the bottom of the suspending component 2 in an inverted T-shaped structure so that the container 1 is mounted on the hook 21.

As shown in FIG. 1, the main track A and each of the first branch track B and the second branch track C form a closed conveying path. In this way, in a case that the container checking station fails to carry out packing and checking operations within a short period due to a failure, or the checking capability thereof does not meet the conveying capacity of the container 1, at least part of the containers 1 can continue to move forward from the branch tracks to the main track A, so that the container 1 continues to move around the closed conveying path, and waits for the checking station to resume normal operation ability by extending the moving path.

In this embodiment, abnormalities in a picking process are automatically handled without human intervention, which can improve the automation level of the picking process, prevent the container 1 from being crowded on the track 30, and improve the safety of the picking process.

In some embodiments, the predetermined position of the track 30 is additionally provided with a landing region corresponding to the main track A or the branch tracks. When the checking station fails for a long time or the front track fails, the container 1 may be released to the landing region firstly. By the handling method, the useless power loss of the goods picking and conveying device can be reduced.

In some embodiments, as shown in FIG. 1, a mounting region 3 is arranged on the main track A for mounting the container 1 on the main track A. After picking is completed, the picker mounts the container 1 on the suspending component 1. As the suspending component 2 in this region has a relatively low height, which is convenient for the picker to mount the container 1.

In order to conveniently mount the container in the regions where the respective shelves 11 are located, a plurality of mounting regions 3 can be arranged on the main track A. As shown in FIG. 1, each of the transverse track sections of the C-shaped main track A is provided with one of the mounting regions 3. Since the shelves 11 are placed in two regions on the left and right, and there is a passage between the shelves 11 in the two regions, the mounting regions 3 can be located at a position corresponding to the passage, so that the picker can conveniently carry out mounting operations after picking the goods from the shelves 11 in the two regions.

In some embodiments, the goods picking and conveying device further includes an interval retaining component 4, which is arranged on the main track A downstream of the mounting region 3 to determine the time difference of the adjacent container 1 passing through the interval retaining component 4, so that a predetermined distance interval is kept between the adjacent container 1.

For example, the interval retaining component 4 is close to the mounting region 3, so that the container 1 are sorted as soon as possible with sufficient distance. Or the interval retaining component 4 is positioned on the branch tracks.

After new container 1 is mounted on the track 30, the interval retaining component 4 can control the distance between the new container 1 and the previous container 1, so that adjacent container 1 do not interfere with each other and their conveying reliability is improved. The interval retaining component 4 is internally provided with a control unit by which the time difference between the adjacent containers 1 passing through the interval retaining component 4 can be calculated. If the time difference is less than a preset time difference threshold, the distance between the adjacent containers 1 is indicated close and necessarily adjusted.

In a specific embodiment, the interval retaining component 4 includes a driving component and a blocking component. The blocking component can move in the direction perpendicular to the track 30, and the driving component can drive the blocking component to move. If the distance between the mounted container 1 and the previous container 1 is less than the predetermined distance, the blocking component can be extended to temporarily prevent the newly mounted container 1 from moving. If the distance between the mounted container 1 and the previous container 1 is up to the predetermined distance after mounting the container 1, the blocking component can be retracted to make the newly mounted container 1 move along the track 30.

The following takes FIG. 1 as an example to illustrate the specific working principle of the goods picking system of the present disclosure.

(1) The picker picks the goods according to the order and places the picked goods into the container 1, and mounts the container 1 on the suspending component 2 the nearby mounting region 3.

(2) The sliding track 32 in the track 30 moves to drive the suspending component 2 to move clockwise along the arrow A1, and the distance between the two suspending components 2 is controlled by the interval retaining component 4 to ensure that the adjacent suspending components 2 meet the preset distance.

Figure 6:
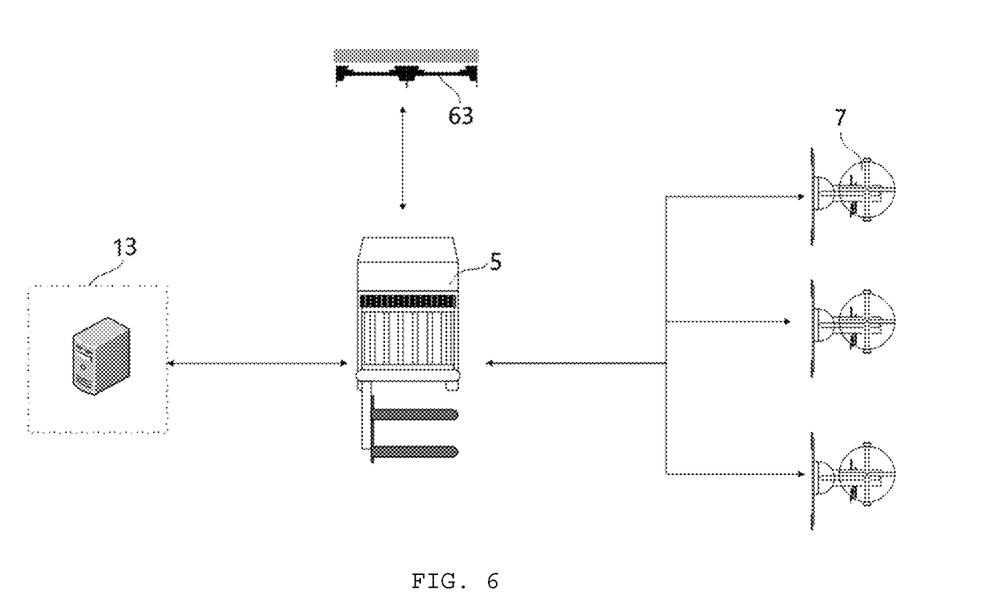
FIG. 6 is a control schematic diagram of a goods picking system according to an embodiment of the present disclosure.

(3) Referring to FIG. 6, the goods picking system also includes a background service system 13, which is configured to receive the corresponding information between the ordered goods provided from the outside and the container 1, and determine the conveying information of the container 1 according to an order. The conveying information includes the branch track to be entered by the container 1 and the serial number of the checking station to be entered by the container 1. The background service system 13 can transmit the conveying information to the container scanning controller 5.

The container scanning controller 5 is configured to obtain the conveying information of the current container 1 from the background service system 13 according to the identification result of the container 1. Specifically, after the container scanning controller 5 scans the identification of the container 1, the container scanning controller 5 matches the identification result with the conveying information to control the conveying direction of the container 1. At the same time, the container scanning controller 5 can also feed the operation result of the current container 1 back to the background service system 13.

(4) If the container 1 will move to the single-container checking station 9, the container scanning controller 5 controls the moving slideway 61 to switch to align with the turning slideway 62. The containers 1 move to the second branch track C along the arrow C1 in sequence through the moving slideway 61 and the turning slideway 62. At the same time, the moving slideway 61 can also feed the moving results back to the container scanning controller 5.

when the container 1 moves to the predetermined single-container checking station 9, the container scanning controller 5 sends a signal for releasing the designated suspending component 2 to the disengagement trigger 7 so that the container falls on the corresponding single-container checking station 9. At the same time, the disengagement trigger 7 can feed the signal for releasing the designated suspension 2 back to the container scanning controller 5.

(5) If the container 1 will move to the container converging checking station 10, the container scanning controller 5 makes the moving slideway 61 to be positioned between the main track A and the first branch track B. The containers 1 move to the first branch track B through the moving slideway 61 in sequence, and move from the arrow B1 to the arrow B2. Meanwhile, the moving slideway 61 can also feed the moving results back to the container scanning controller 5.

When the container 1 moves to the predetermined container converging checking station 10, the container scanning controller 5 sends a signal for releasing the designated suspending component 2 to the disengagement trigger 7, so that the container falls on the corresponding container converging checking station 9. At the same time, the disengagement trigger 7 can feed the signal for releasing the designated suspending component 2 back to the container scanning controller 5.

The containers 1 corresponding to the same order task preferably enter the same container converging checking station 10. The containers 1 may be adjacent to each other, or there may be container corresponding to other orders between the containers. In such a way, it can be ensured that the goods in the same order are checked and packed in one container converging checking station 10 to improve the efficiency of checking and packing.

When the containers 1 are distributed to the respective checking stations, the background service system 13 can make the containers 1 corresponding to the respective checking stations tend to be evenly distributed, so as to ensure the average production tasks of the checking station, thereby improving the picking efficiency to the greatest extent.

The checking station is in communication connection with the background service system 13, and configured to provide information for checking whether the ordered goods are correct, a packing type of the ordered goods, and/or whether the current container 1 is required to be separated/merged after identifying the container 1.

(6) When the checking station fails or lacks the handling capacity, the container 1 on the first branch track B can continue to enter the main track A along the arrow B3 and move along the arrow A2. The container 1 on the second branch track C can continue to enter the main track A along the arrow C1 and move along the arrow A2.

Secondly, the present disclosure also provides a picking method based on the above-mentioned goods picking system. In one embodiment, the picking method includes:

Step 100: Causing the container 1 to move along the track 30;

Step 200: identifying the container 1 by the container scanning controller 5, obtaining the conveying information of the container 1 according to an identification result by the container scanning controller 5, and causing each container 1 to move to a corresponding checking station according to the conveying information of the container 1 by the container scanning controller 5.

In this embodiment, the container scanning controller can identify the container to obtain the conveying information thereof, so that the respective containers automatically and accurately move to the corresponding checking stations. The automation level of the goods conveying process can be improved, and the physical consumption of pickers is reduced, therefore the efficiency and accuracy of the entire picking process is improved.

In some embodiments, obtaining conveying information of the container 1 by the container scanning controller 5 according to the identification result so as to cause each container 1 to move to the corresponding checking station in the step 200 includes:

Step 210: obtaining a branch track to be entered by the container 1 and a serial number of the checking station to be entered by the container 1 according to the identification by the container scanning controller 5;

Step 220: causing the container 1 to move from a main track A to a corresponding container converging checking station 10 via a first branch track B by the container scanning controller 5, or causing the container 1 to move from the main track A to a corresponding single-container checking station 9 via second branch track C by the container scanning controller 5. And the step 220 is executed after the step 210.

In some embodiments, the goods picking method of the present disclosure further includes the following steps after obtaining the conveying information of the container 1 through the step 200:

Step 300: sending a state control signal to a track switching mechanism 6 by the container scanning controller 5;

Step 400: causing the track switching mechanism 6 to receive the state control signal and switch into a connection state of the main track A and a branch track to be entered by the container 1. This step is executed after the step 300.

In this embodiment, the container can optionally move to matching branch track, which is equivalent to establishing a connection relationship between the main track A and different branch tracks, so that the container can be reliably moved to the corresponding branch track.

In the embodiment as shown in FIG. 4, the step 400 specifically includes: if the container 1 will enter the first branch track B, switching the moving slideway 61 to a first position between the main track A and the first branch track B; if the container 1 will enter the second branch track C, switching the moving slideway 61 to a second position directly facing the turning slideway 62.

In some embodiments, in the process of the current container 1 moving from the track 30 to the checking station in the step 200, the goods picking method of the present disclosure further includes:

Step 500: determining whether the container 1 has arrived at predetermined checking station by the container scanning controller 5; if the container has arrived, sending a release instruction to a disengagement trigger 7; if not, keeping the container 1 moving;

Step 600: triggering the disengagement trigger after receiving the release instruction to disengage the container 1 from the track and enter the corresponding checking station.

The step 500 is executed after the step 400, and the step 600 is executed after the step 500. In this embodiment, the container 1 can automatically drop down when moving to the predetermined checking station, thus achieving automatic circulation from the conveying device to the checking station, and causing the container 1 accurately entering the predetermined checking station.

Optionally, determining whether the container 1 has arrived at the predetermined checking station by the container scanning controller 5 in the step 500 specifically includes: determining whether the container 1 has arrived at the predetermined checking station according to a required time for the container 1 depart from the container scanning controller 5 to arrive at the predetermined checking station by the container scanning controller 5.

In this embodiment, the manner of determining whether the container has arrived at the predetermined checking station is relatively simple, by which the container 1 is determined to arrive at the predetermined checking station in a relatively short period, therefore avoiding the fact that the container 1 keeps moving along the track 30 beyond the predetermined checking station due to a long time occupied by the determination process.

Optionally, determining whether the container 1 has arrived at the predetermined checking station by the container scanning controller 5 in the step 500 specifically includes:

Step 510: identifying the container 1 and sending an identification result to the container scanning controller 5 by the scanning component arranged on the disengagement trigger 7; and Step 520: determining whether the current container 1 where the current disengagement trigger 7 is located has arrived at the predetermined checking station by the container scanning controller 5; if the container 1 has arrived, sending a release instruction to the current disengagement trigger 7; if not, keeping the container 1 moving; Until the container 1 moves to the next disengagement trigger 7, scanning and determination in the step 520 is executed again.

In this embodiment, the disengagement timing of the container 1 may be more accurately determined, and there is no need to obtain the time required for the container 1 to arrive at the predetermined checking station through multiple tests, thereby increasing the universality of this embodiment.

In some embodiments, in a case that the container checking station is faulty or the checking capacity thereof does not meet the conveying volume of the container 1, the goods picking method of the present disclosure further includes: causing some container 1 to move from the branch track to the main track A so as to keep the container moving around a closed conveying path.

In some embodiments, when the container 1 moves towards the container converging checking station 10, the containers 1 in the same order move to the same container converging checking station 10.

In some embodiments, before the step 100, the goods picking method of the present disclosure further includes: mounting the container 1 on the main track A in mounting region 3.

A goods picking and conveying device, a goods picking system and a good picking method, provided by the present disclosure, are described in detail in the above. In this text, the principles and implementations of the present disclosure are described according to specific embodiments. The above embodiments are described only for helping understanding of the methods and core ideas of the present disclosure. It should be noted that persons of ordinary skill in the art may make, within the principles of the present disclosure, several improvements and modifications to the present disclosure, and the improvements and modifications also fall within the protection scope of the claims of the present disclosure.

What is claimed is:

1. A goods picking and conveying device, comprising:
   a container configured to accommodate goods;
   a track arranged on a suspended ceiling of a warehouse to guide the container to move, the track includes a main track and a plurality of branch tracks, the main track is provided with a mounting region for the container to be mounted on the main track; and
   a container scanning controller, configured to identify the container running on the track, obtain conveying information of the container according to an identification result, and cause the container to move to a corresponding checking station according to the conveying information of the container; and
   an interval retaining component, which is arranged on the main track downstream of the mounting region to determine a time difference of adjacent containers passing through the interval retaining component, so that a predetermined distance interval is kept between the adjacent containers.

2. The goods picking and conveying device according to claim 1, wherein the checking station comprises a single-container checking station and a container converging checking station, and the plurality of branch track comprising a first branch track configured to guide the container to move from the main track to the container converging checking station, and a second branch track configured to guide the container to move from the main track to the single-container checking station.

3. The goods picking and conveying device according to claim 2, further comprising a track switching mechanism, which is arranged at a junction between the main track and each of the branch tracks, and configured to switch to a connection state of the main track and a branch track to be entered by the container after receiving a control signal of the container scanning controller.

4. The goods picking and conveying device according to claim 3, wherein the first branch track is positioned on an extension line of the main track, and the second branch track is disposed angularly to the main track;

wherein the track switching mechanism comprises:
a turning slideway with a first end connected to the second branch track; and
a moving slideway configured to switch between a first position and a second position after receiving the control signal of the container scanning controller, wherein the first position is located between the main track and the first branch track, and the second position directly faces a second end of the turning slideway.

5. The goods picking and conveying device according to claim 1, further comprising disengagement triggers, which are arranged on the track corresponding to respective checking stations, and configured to be triggered after receiving release instruction of the container scanning controller, so as to cause the container to disengage from the track and enter the corresponding checking station.

6. The goods picking and conveying device according to claim 1, further comprising a container slideway, which is arranged between the track and the checking station to guide the container disengaged from the track to the checking station.

7. The goods picking and conveying device according to claim 6, further comprising a suspending component configured to suspend the container, wherein the track comprises a fixed track arranged on the suspended ceiling and a sliding track slidably arranged with respect to the fixed track, and the suspending component is arranged on the sliding track and is movable along with the sliding track.

8. The goods picking and conveying device according to claim 2, wherein the main track and each of the first branch track and the second branch track form a closed conveying path.

9. A goods picking system, comprising:
the goods picking and conveying device according to claim 1; and
the checking station configured to check and pack the goods in the container.

10. The goods picking system according to claim 9, wherein the checking station comprises:
a single-container checking station configured to check and pack the goods in a single container; and
a container converging checking station configured to check and pack the goods in a plurality of containers together.

11. The goods picking system according to claim 9, further comprising a background service system) configured to receive corresponding information between ordered goods provided from outside and the container, and determine the conveying information of the container according to an order, wherein the container scanning controller is configured to obtain the conveying information of current container from the background service system) according to the identification result of the container.

12. The goods picking system according to claim 9, further comprising a background service system configured to receive corresponding information between ordered goods provided from outside and the container, wherein the checking station is in communication connection with the background service system to provide information for checking whether the ordered goods are correct, a packing type of the ordered goods, and/or whether the current container is required to be separated/merged after identifying the container.

13. A picking method based on the goods picking system according to claim 9, comprising:
causing the container to move along the track; and
identifying the container by the container scanning controller, obtaining conveying information of the container according to an identification result by the container scanning controller, and causing the container to move to a corresponding checking station according to the conveying information of the container by the container scanning controller.

14. The goods picking method according to claim 13, wherein obtaining conveying information of the container by the container scanning controller according to the identification result so as to cause the container to move to the corresponding checking station comprises:
obtaining a branch track to be entered by the container and a serial number of the checking station to be entered by the container according to the identification result by the container scanning controller; and
causing the container to move from a main track to a corresponding container converging checking station via a first branch track by the container scanning controller, or move from the main track to a corresponding single-container checking station via a second branch track by the container scanning controller.

15. The goods picking method according to claim 13, further comprising the following steps after obtaining the conveying information of the container:
sending a state control signal to a track switching mechanism by the container scanning controller; and
causing the track switching mechanism to receive the state control signal and switch into a connection state of the main track and a branch track to be entered by the container.

16. The goods picking method according to claim 13, wherein in a process of causing the current container to move from the track to the checking station, further comprising:
determining whether the container has arrived at a predetermined checking station by the container scanning controller; if so, sending a release instruction to a disengagement trigger; if not, keeping the container moving; and
triggering the disengagement trigger after receiving the release instruction to cause the container to disengage from the track and enter the corresponding checking station.

17. The goods picking method according to claim 16, wherein determining whether the container has arrived at the predetermined checking station by the container scanning controller comprises:
    determining whether the container has arrived at the predetermined checking station according to a required time for the container to depart from the container scanning controller to arrive at the predetermined checking station by the container scanning controller.

18. The goods picking method according to claim 16, wherein determining whether the container has arrived at the predetermined checking station by the container scanning controller comprises:
    identifying the container and sending an identification result to the container scanning controller by a scanning component arranged on the disengagement trigger; and
    determining whether the container where the disengagement trigger is located has arrived at the predetermined checking station by the container scanning controller; if so, sending a release instruction to current disengagement trigger; if not, keeping the container moving.

19. The goods picking method according to claim 14, wherein in a case that the container checking station is faulty or check capacity does not meet conveying volume of the container, further comprising:
    causing at least part of the container) to move from a branch track to the main track so as to keep the container moving around a closed conveying path.

20. The goods picking method according to claim 14, wherein containers in the same order move to the same container converging checking station when containers move to the container converging checking station.

\* \* \* \* \*

UNITED STATES PATENT AND TRADEMARK OFFICE
CERTIFICATE OF CORRECTION

| | | |
|---|---|---|
| PATENT NO. | : 12,208,963 B2 | Page 1 of 1 |
| APPLICATION NO. | : 17/258388 | |
| DATED | : January 28, 2025 | |
| INVENTOR(S) | : Song Han | |

It is certified that error appears in the above-identified patent and that said Letters Patent is hereby corrected as shown below:

On the Title Page

Item (87), the PCT publication information should read:
-- (87)   PCT Pub. No.: WO2020/020357
            PCT Pub. Date: Jan. 30, 2020 --

Signed and Sealed this
Sixth Day of May, 2025

Coke Morgan Stewart
*Acting Director of the United States Patent and Trademark Office*